UNITED STATES PATENT OFFICE.

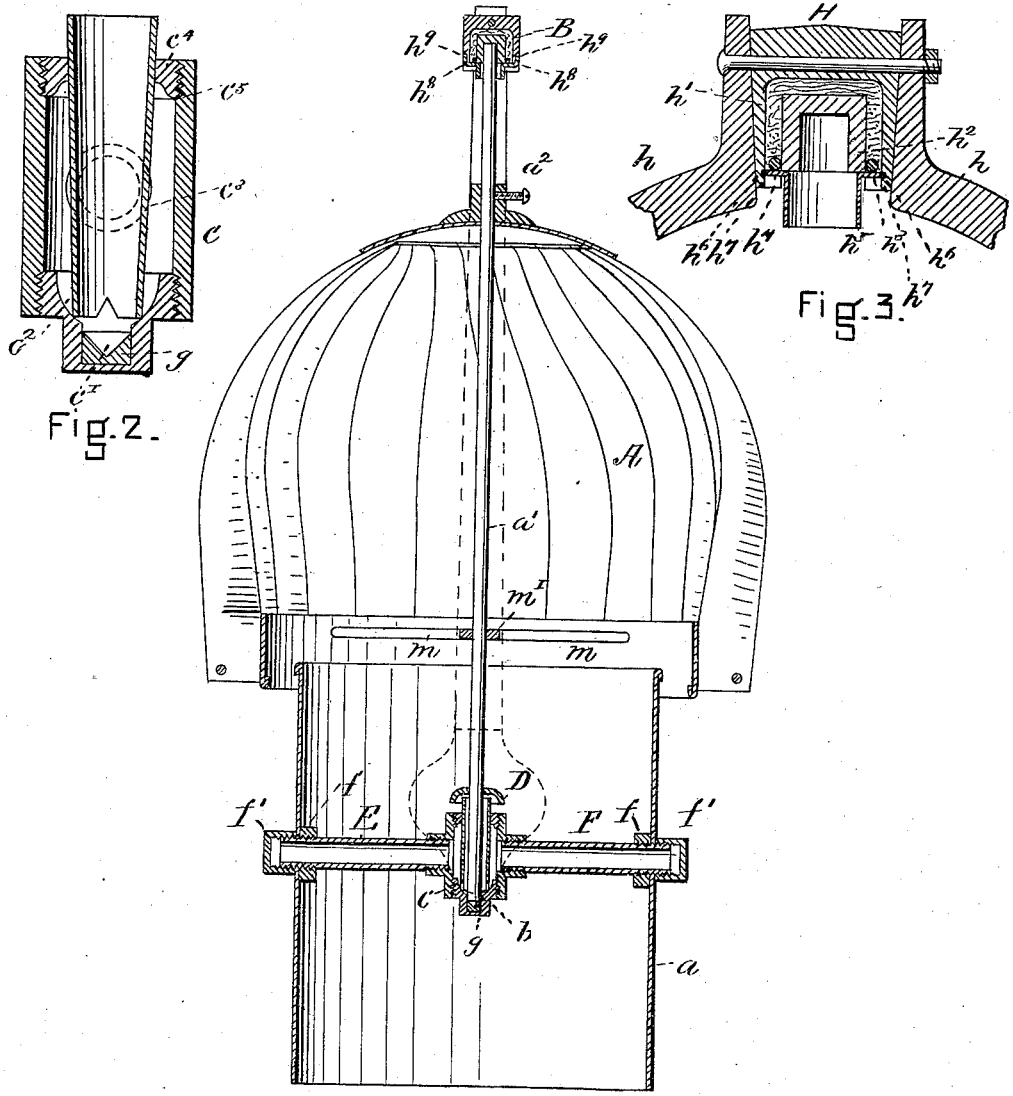

GEORGE FENN, OF MELROSE, MASSACHUSETTS.

VENTILATOR.

SPECIFICATION forming part of Letters Patent No. 257,484, dated May 9, 1882.

Application filed August 8, 1881. (No model.)

*To all whom it may concern:*

Be it known that I, GEORGE FENN, of Melrose, in the county of Middlesex and State of Massachusetts, a citizen of the United States, have invented a certain new and useful Improvement in Ventilators, of which the following is a full, clear, and exact description, reference being had to the accompanying drawings, forming a part of this specification, in explaining its nature, in which—

Figure 1 is a vertical central section of the ventilator. Fig. 2 is a cross-section of the lower bearing, enlarged, at right angle to the section represented in Fig. 1. Fig. 3 is a cross-section of the upper bearing, enlarged, at right angle to the section shown in Fig. 1.

This invention relates to means for supporting the revolving portion or head of a ventilator within the casing, shell, or frame.

The ventilator illustrated in the drawings is that known as the "Archimedean;" and it embraces the revolving part or head A, of ordinary construction, the casing and support $a$, by which it is secured to the end of a chimney or pipe, the spindle $a'$, to which the part or head A is fastened by the set-screw $a^2$, and which has two bearings in the stationary part of the ventilator—one, B, at the top, and the other, $b$, at the bottom.

This invention has to do with the spindle-bearings at the top and bottom, and with the means for bracing the lower portion of the revolving part or head in relation to the spindle. It is of course necessary that the bearings be so constructed that there be as little friction as possible upon the ends of the spindle. I will first describe the lower spindle-bearing. This bearing embraces means whereby the lower end of the spindle is kept constantly lubricated or oiled, and a supply of lubricating material sufficient for a number of years provided. It consists in a malleable-iron joint or cross, $c$, which is shaped substantially as shown in Fig. 2, to have the recess $c'$, in which the end of the spindle projects or rests, the beveled portion or shoulder $c^2$, upon which the sleeve $c^3$, which surrounds the spindle, rests. This sleeve has a screw ring or nut, $c^4$, at its upper end, which screws into the hole $c^5$ in the upper part of the joint or cross; and there are formed one or more recesses or holes in its lower portion, by which the lubricant feeds into the hole within the sleeve and at the lower end of the joint or cross. A dust-cap, D, is fitted to the spindle to cover the opening in the upper part of the sleeve.

Extending laterally from the cross or joint are the malleable-iron pipes E F. These screw into the cross or joint and serve two purposes: first, as a reservoir for holding oil or other lubricant, and, second, as means by which the bearing is fastened to the case. This last-named object is accomplished by forming a screw-thread upon the end of each pipe, screwing the nut $f$ thereon, and making the pipes of such length that their ends shall pass through the casing and receive the screw-caps $f'$.

It will be observed that by this construction the casing is firmly nipped between the caps and the nuts and the bearing supported in a very solid manner. It will also be observed that by making the bearings and reservoir of gas or steam fittings a considerable saving in the cost of manufacture is attained. It will be noticed, also, that a sufficient supply of oil can be stored within the cross and horizontal pipes to provide the bearing with lubrication for a number of years; also, that the oil cannot escape from the reservoir any more rapidly than it is necessary for thoroughly lubricating the bearing.

If desired, a steel step, $g$, may be placed in the bottom of the recess $c'$ for the end of the spindle to rest upon.

The upper bearing, B, is formed in the block H, to which the arms $h$ are secured. This block has a large recess, $h'$, of cylindrical shape, which opens downwardly, and within this recess is arranged a sleeve, $h^2$, preferably of an anti-frictional nature. This sleeve is closed at its top, and is not fastened to the block, but is surrounded at its bottom by a metallic ring, $h^3$, which prevents it from swinging or moving too much, and the remainder of the sleeve is packed in hair, so that the sleeve has a certain yielding movement, by which it readily accommodates itself to the axial line of the spindle. It is held in place by means of the slide $h^4$, which is a plate having a downwardly-projecting sleeve, $h^5$, and which is held in place by being slid into the ways or grooves $h^6$ upon the inner sides of the projecting portions $h^7$ of the block. The ends $h^8$ of the sleeve are then bent over into the recesses $h^9$ upon the sides of the block, and the joint is packed with suitable water-proof cement.

The head A is provided with the malleable-iron braces m, which are cast in one piece to radiate from the center m', in which there is a hole, through which the spindle passes. This insures a very cheap construction and a very strong one.

The advantages of the invention have been described in connection with the description of the various features.

It will be observed that the sleeve about the lower end of the spindle extends downwardly within the joint or cross to, or very nearly to, the bottom of the cup, and that the body of oil within the cup and within the branches or pipes is above the bottom of this sleeve. It will also be noticed that the oil escape or passage from the cup to the bearing consists in one or more small holes, and that, owing to the shape of the sleeve, the size of the openings, and the relation which the sleeve bears to the cup and remainder of the reservoir, it is impossible for oil to escape therefrom at any time or in any position of the bearing. Therefore the reservoir can be filled with oil at the shop or factory and be transported without any danger of its escape.

I am aware that the patent to H. Thomas, No. 94,254, dated August 31, 1869, shows and describes a ventilator having a lower spindle-bearing and hollow spindle, and an oil-reservoir located at the top of the ventilator, and a hollow spindle connecting the reservoir with the spindle-bearing, whereby oil or other lubricant is fed thereto; but I do not employ the reservoir in the upper part of the ventilator, neither do I use the hollow spindle; and I therefore consider that the device described in the said patent does not embrace the spirit of my invention.

Having thus fully described my invention, I claim and desire to secure by Letters Patent of the United States—

1. In a ventilator, the oil-reservoir and bearing, and means for supporting it, consisting of the gas or steam cross c, the pipes E F, the spindle-bearing within the cross, and means for closing the ends of the pipes and for fastening them to the casing of the ventilator, all substantially as and for the purposes specified.

2. In a ventilator, the combination of a gas or steam cross, containing a spindle-bearing, and the spindle, all substantially as and for the purposes described.

3. As a spindle-bearing for a ventilator, the steam or gas cross, having the hole or recess $c$ and the sleeve $c^3$, all substantially as and for the purposes described.

4. As a means of supporting a spindle-bearing in a ventilator, the steam or gas cross $c$ and the lateral pipes E F, fastened to the casing of the ventilator, all substantially as described.

5. As an upper bearing for a ventilator-spindle, the sleeve $h^2$, supported within the recess $h'$ in the block H, substantially as described, and surrounded by a packing of yielding material, all substantially as and for the purposes specified.

6. In a ventilator, the combination of the spindle $a'$, the head A, and the metallic braces $m$, cast in one piece, all substantially as and for the purposes described.

7. In a ventilator, an oil-cup consisting of the joint, cross, or other suitable casing, and the sleeve $c^3$ within the cup, extending to the bottom thereof, and one or more small escapes or passages connecting the chamber without the sleeve with the bearing within, all substantially as and for the purposes specified.

GEORGE FENN.

Witnesses:
F. F. RAYMOND, 2d,
W. C. FOGG.